United States Patent
Qin et al.

(10) Patent No.: US 8,283,828 B2
(45) Date of Patent: Oct. 9, 2012

(54) ELECTRIC MOTOR

(75) Inventors: Rui Feng Qin, Hong Kong (CN); Cheng Shun Du, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 495 days.

(21) Appl. No.: 12/555,318

(22) Filed: Sep. 8, 2009

(65) Prior Publication Data

US 2010/0060096 A1   Mar. 11, 2010

(30) Foreign Application Priority Data

Sep. 8, 2008 (CN) .......................... 2008 1 0216062

(51) Int. Cl.
*H02K 21/16* (2006.01)
(52) U.S. Cl. .............................. 310/154.11; 310/154.08
(58) Field of Classification Search ............. 310/154.21, 310/154.22, 154.03, 154.08, 154.09, 154.25, 310/89
See application file for complete search history.

(56) References Cited

U.S. PATENT DOCUMENTS

| | | | | |
|---|---|---|---|---|
| 7,427,817 B2* | 9/2008 | Uenishi et al. | ........... | 310/154.22 |
| 7,498,706 B2* | 3/2009 | Kuroda | .................... | 310/154.01 |
| 7,732,962 B2* | 6/2010 | Kuroda | .................... | 310/154.01 |
| 7,800,270 B2* | 9/2010 | Kuroda | .................... | 310/154.01 |
| 7,990,010 B2* | 8/2011 | Nemoto et al. | .......... | 310/154.03 |
| 8,013,489 B2* | 9/2011 | Kuroda | .................... | 310/154.21 |

* cited by examiner

*Primary Examiner* — Thanh Lam

(74) *Attorney, Agent, or Firm* — Muncy, Geissler, Olds & Lowe, PLLC

(57) ABSTRACT

An electric motor comprises a stator and a rotor received in the stator. The stator comprises a shell. The shape of a cross section of the shell perpendicular to the rotor axis is a polygon. The shell comprises a plurality of side walls and arcuate connection portions connecting neighboring side walls. The stator comprises 2n magnets disposed in the arcuate connection portions. The magnets form 2m magnetic poles, where m, n are unequal positive integers. Optionally, m is equal to half or twice n. The permanent magnets of the motor are located in the inner angle of polygon shell. Thus the diameter of rotor can be the greater, and the power density of motor can be increased in the same volume.

11 Claims, 4 Drawing Sheets

ELECTRIC MOTOR

CROSS REFERENCE TO RELATED APPLICATIONS

This non-provisional patent application claims priority under 35 U.S.C. §119(a) from Patent Application No. 200810216062.0 filed in The People's Republic of China on Sep. 8, 2008.

FIELD OF THE INVENTION

This invention relates to an electric motor and in particular, to an electric motor having a square stator.

BACKGROUND OF THE INVENTION

A cross section of a conventional permanent magnet DC motor is shown in FIG. 7. Such motors uses a cylindrical shell 1. Permanent magnets 2 are fixed to an inner surface of the cylindrical shell 1 and are located about the periphery of a rotor 3. However, a motor with such a round structure is easy to roll about when being transported and the installation is inconvenience requiring an additional positioning device.

A motor having a square cross section developed in recent years is shown in FIG. 8. This motor uses a square shell 1' having four side walls. Permanent magnets 2' are fixed to the inner surface of the four side walls. Although such a motor with a square shell solves the above-mentioned shortcomings of conventional cylindrical motor, it has the following problems: 1) the shell has a low space utilization rate, and the space of the four corners are not used; 2) the diameter of rotor 3' is equal to the width of shell 1' minus the thickness of the side walls, the thickness of the permanent magnets 2' and the width of air gap between magnets 2' and rotor 3'. Attempts to reduce the size of the motor are restricted but the diameter of the rotor and the thickness of the magnets and the shell. As a result, the motor has low power density in a predetermined volume.

SUMMARY OF THE INVENTION

Therefore, there is a desire for a new type of square motor with higher space utilization.

Accordingly, in one aspect thereof, the present invention provides an electric motor comprising: a stator; and a rotor received in the stator; the stator comprising a shell, the cross section of the shell perpendicular to the rotor axis being polygon, characterized in that: the shell comprises a plurality of side walls and arcuate connection portions connecting neighboring side walls, the stator comprises 2n magnets located in the arcuate connection portions, the magnets forming 2m magnetic poles, with m, n being positive integers, and m is not equal to n.

Preferably, m is equal to half or twice n.

Preferably, the shell has a uniform thickness, and a gap is formed between the magnets and the corresponding arcuate connection portions, adhesive for securing the magnets to the shell is placed in the gap.

Preferably, the shell has a uniform thickness, and a slab of magnetically conductive material is disposed between the magnets and the corresponding arcuate connection portion.

Preferably, the thickness of the arcuate connection portions is greater than the thickness of the side walls.

Preferably, the magnets are attached to the inner surface of corresponding arcuate connection portion or embedded in the corresponding arcuate connection portion.

Preferably, some of the magnets are attached to the inner surface of corresponding arcuate connection portions, and the remaining magnets are embedded in the corresponding arcuate connection portions, the surface-mounted magnets and embedded magnets being alternately circumferentially spaced about the shell.

Preferably, the shell is square and there are four magnets which are respectively attached to the inner surface of four arcuate connection portions or are embedded in the four arcuate connection portions of the shell, the magnets commonly forming a stator with two magnetic poles.

Preferably, the shell is square and there are four magnets, wherein two magnets are respectively attached to the inner surface of arcuate connection portions in a diagonal of the shell, and the other two magnets are respectively embedded in the arcuate connection portions in another diagonal of the shell.

Preferably, there are four magnets which are respectively attached to the inner surface of four arcuate connection portions, the magnets commonly forming a stator with eight magnetic poles.

Preferably, the shell is square, there are two magnets which are respectively attached to the inner surface of arcuate connection portions in one diagonal of the shell, commonly forming a stator with four magnetic poles.

The beneficial effects of the present invention is that: the permanent magnets of motor are disposed in the corners of the polygon shell. Thus the diameter of the rotor can be the greater and the power density of motor can be increased without increasing the size of the motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
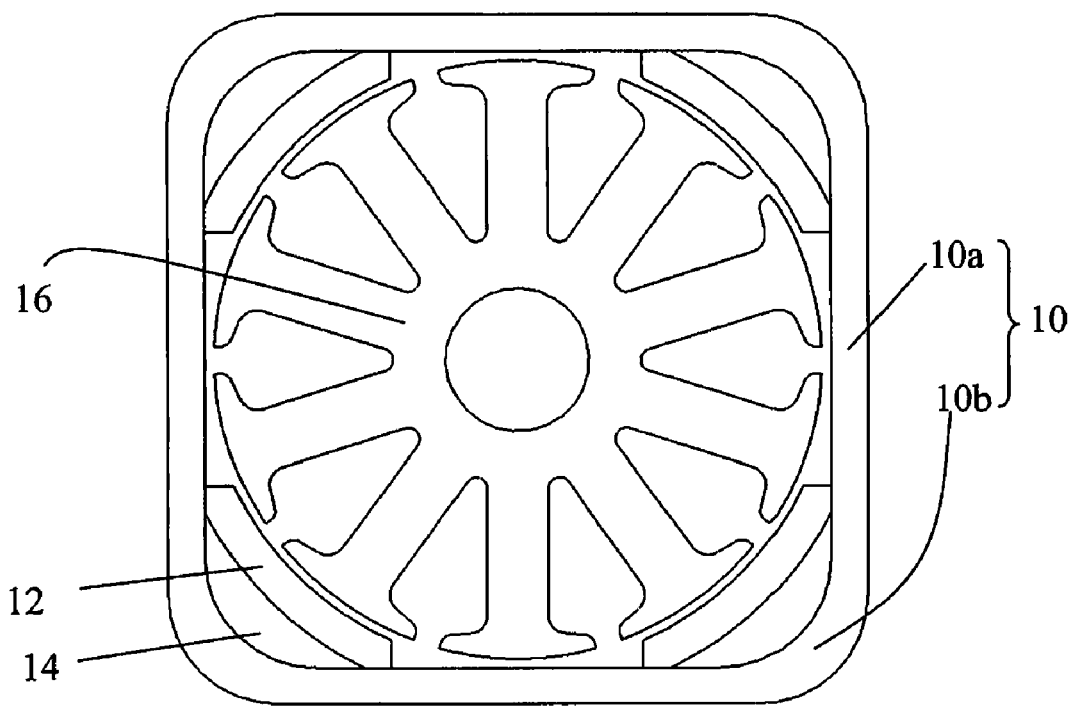
FIG. 1 is a cross sectional view of a motor according to a first embodiment of the present invention.

FIG. 1 illustrates a first embodiment of the present invention in which an electric motor has a stator and a rotor 16 received in the stator. The stator comprises a polygon shell 10, and a plurality of permanent magnets 12. Preferably, the shell 10 is regular polygon. In this embodiment, the cross section of shell 10 perpendicular to the rotor axis is a square. The shell comprises four side walls 10a and neighboring side walls 10a are connected by a corner or arcuate connection portion 10b. The radius of the arcuate connection portion 10b is less than the circumcircle radius of shell 10. The shell 10 has a uniform thickness. There are four permanent magnets 12, which are separately located inside the arcuate connection portions 10b. The center line of each magnet 12 coincides with the center line of the respective arcuate connection portion 10b. Two ends of each magnet 12 are attached to the inner surface of adjacent side walls of shell 10. A gap is formed between the middle part of magnet 12 and the arcuate connection portion 10b. Adhesive is placed in the gap to adhere magnet 12 to the shell 10. In this embodiment, a slab 14 is placed in the gap. The slab is of magnetically conductive material and assists the magnetic linkage between the magnets and the shell. Rotor 16 is placed in the shell 10. In this embodiment, the permanent magnets 12 are located in the four corners of the square shell 10. The diameter of rotor 16 is equal to the width of shell 10 minus the side wall thickness of shell 10 and the width of air gap between the shell 10 and the rotor 16. Thus the diameter of rotor is not restricted by the thickness of the magnets 12. Compared to a motor of conventional technology with the same shell size, the diameter of rotor 16 of the present invention can be made larger.

Figure 2:
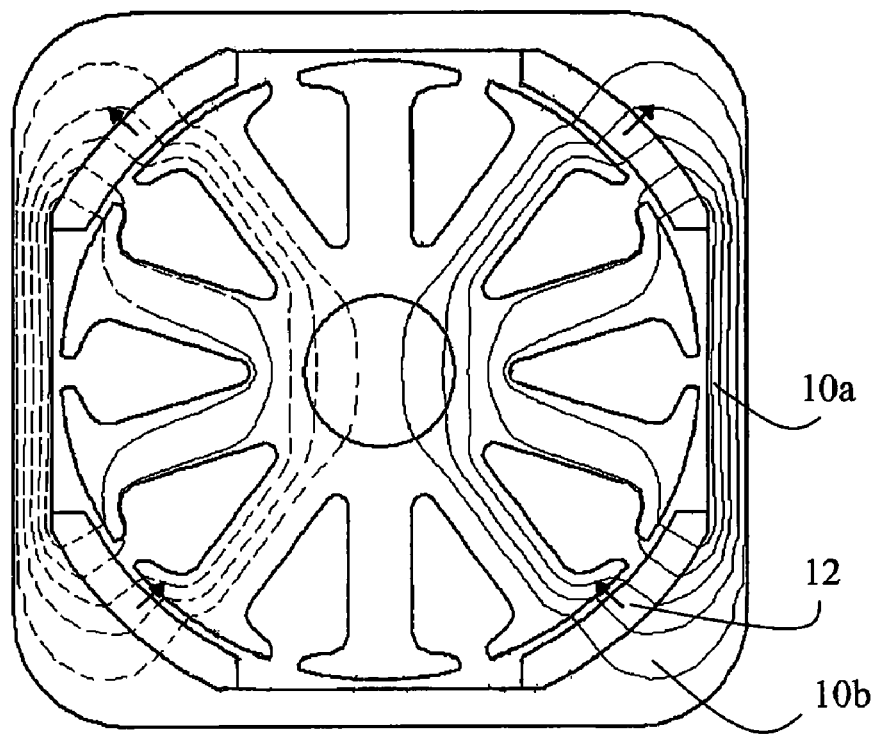
FIG. 2 is a schematic diagram showing magnetic field distribution of a motor according to a second embodiment of the present invention.

A magnetic field distribution schematic diagram of a motor according to a second embodiment of the present invention is shown in FIG. 2. The magnets are polarized along the radial direction, wherein the polarization direction of two adjacent or neighboring magnets is north pole outward, and the polarization direction of the other two neighboring magnets is south pole outward. The magnetic lines from the north pole of the north pole outward magnets extend through the shell 10 and enter the neighboring south pole outward magnets, and then return to the south pole of the north pole outward magnets via the rotor 16. So that the two neighboring magnets with the opposite polarization direction commonly form a magnetic circuit. Solid lines and dotted lines are used to represent the separate magnetic circuits shown in FIG. 2. The four magnets 12 form a stator with two magnetic poles. To be understood, the shell 10 can be non-uniform thickness. In this embodiment, the arcuate connection portions 10b defined in the four corners are made thicker than the thickness of side wall 10a, eliminating the need for the slabs of the first embodiment. The magnets 12 can be directly attached to the inner surface of arcuate connection portions 10b. Such method is called surface-mounted type. In this embodiment, the magnets 12 are fixed to the inner surface of the arcuate connection portions 10b by adhesive. Alternatively, they can be fixed using other methods.

Figure 3:
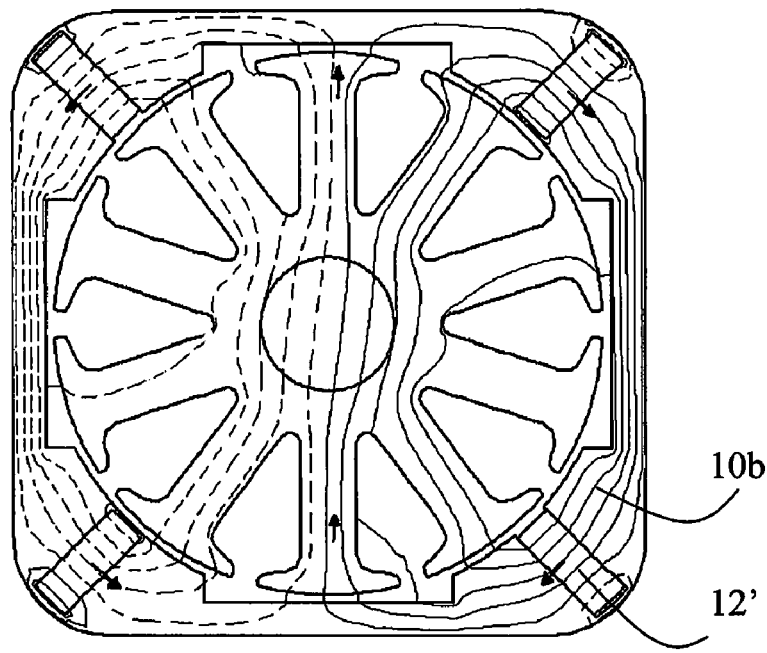
FIG. 3 is a schematic diagram showing magnetic field distribution of a motor according to a third embodiment of the present invention.

The motor of the third embodiment as shown in FIG. 3, is similar to the motor of FIG. 2. The difference is that in the motor shown in FIG. 3, magnets 12' are polarized along the circumferential direction of rotor. Four magnets 12' are separately embedded in the four arcuate connection portions 10b. Such method is called embedded type. The four magnets commonly form a stator with two magnetic poles.

Figure 4:
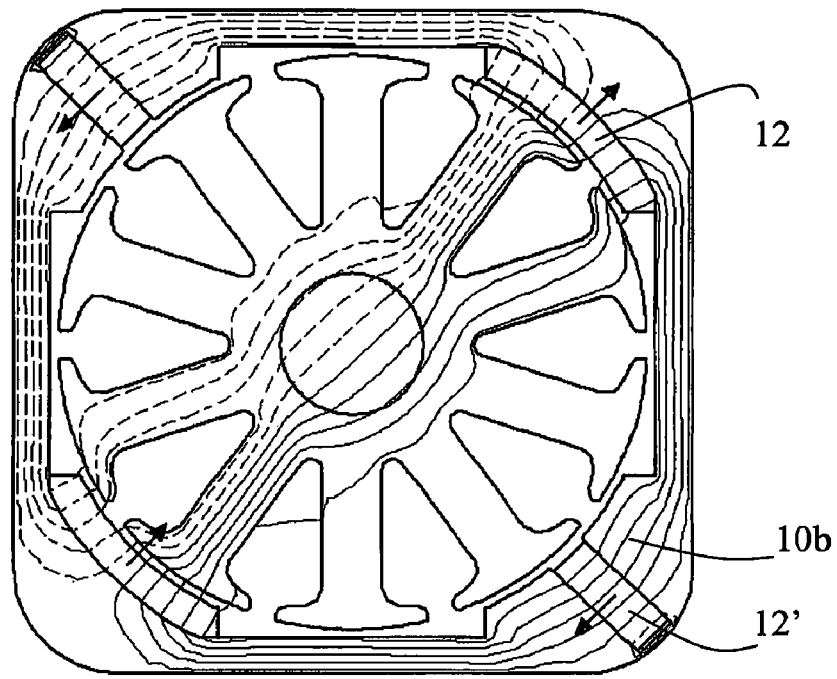
FIG. 4 is a schematic diagram showing magnetic field distribution of a motor according to a fourth embodiment of the present invention.

The motor of the fourth embodiment as shown in FIG. 4, is also similar to the motor of FIG. 2. The difference is that in the motor shown in FIG. 4, a pair of magnets disposed in a diagonal of shell 10 are embedded in the respective arcuate connection portions 10b, and are polarized along the circumferential direction of rotor. Another pair of magnets disposed in another diagonal of shell 10 are directly attached to the inner surface of the respective arcuate connection portions 10b, and are polarized along the radial direction of rotor. The four magnets commonly form a stator with two magnetic poles.

Figure 5:
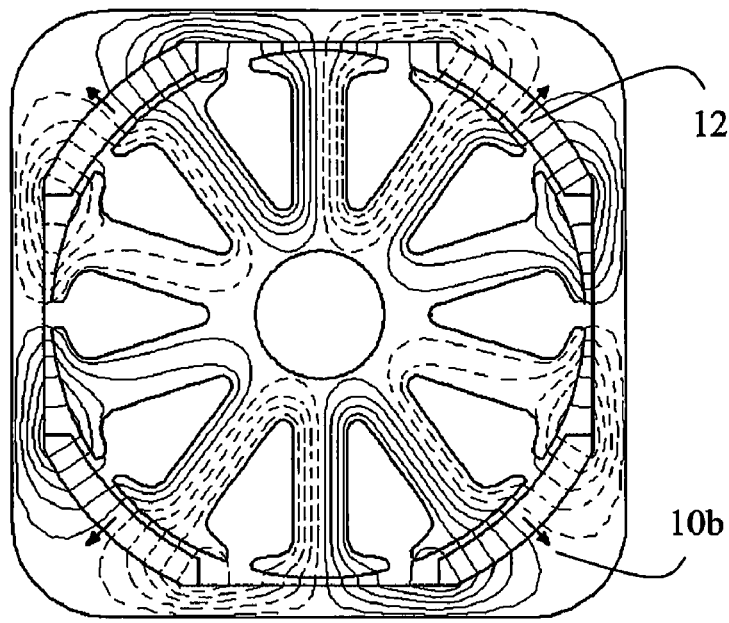
FIG. 5 is a schematic diagram showing magnetic field distribution of a motor according to a fifth embodiment of the present invention.

A motor according to the fifth embodiment of the present invention is shown in FIG. 5. Four magnets 12 of the motor are all polarized along the radial direction of rotor, and are directly attached to the inner surface of the arcuate connection portions 10b. Each magnet has the same polarization direction. In this embodiment, the north pole of each magnet is outward. The magnetic lines issued by the north pole of each magnet extend through the shell and return to the south pole of the magnet via the rotor. Thus each magnet forms two magnetic circuits. The four magnets commonly form a stator with eight magnetic poles.

Figure 6:
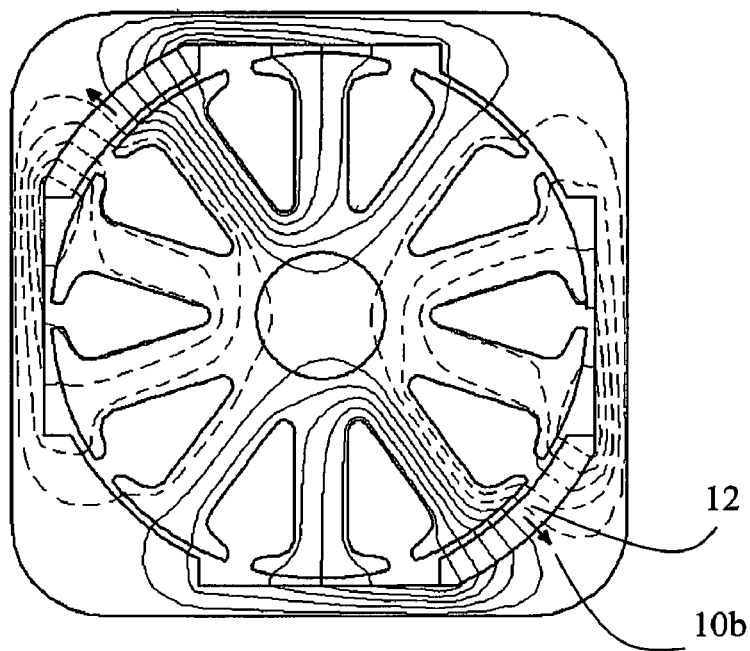
FIG. 6 is a schematic diagram showing magnetic field distribution of a motor according to a sixth embodiment of the present invention.
Figure 7:
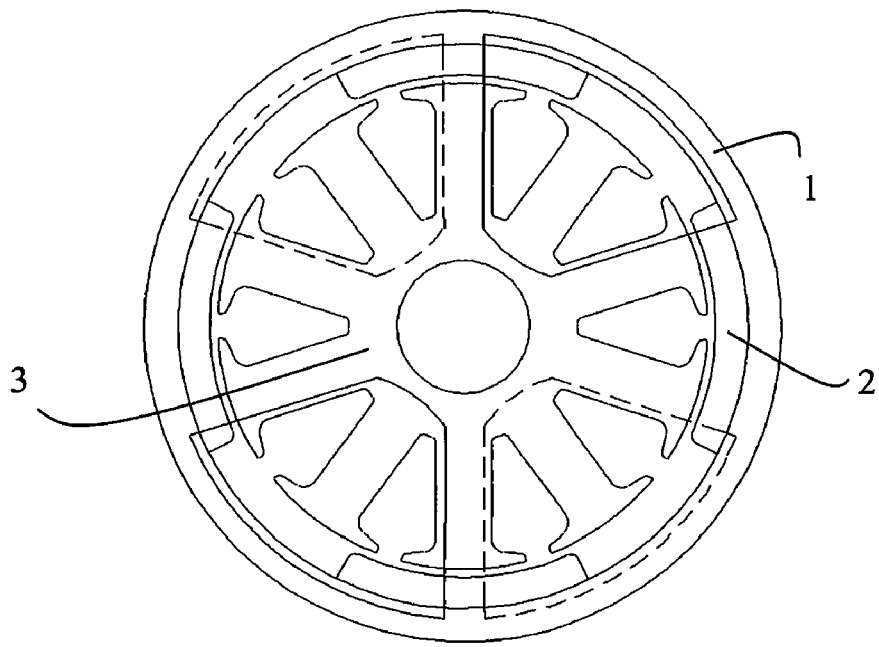
FIG. 7 is a cross sectional view of a conventional motor.
Figure 8:
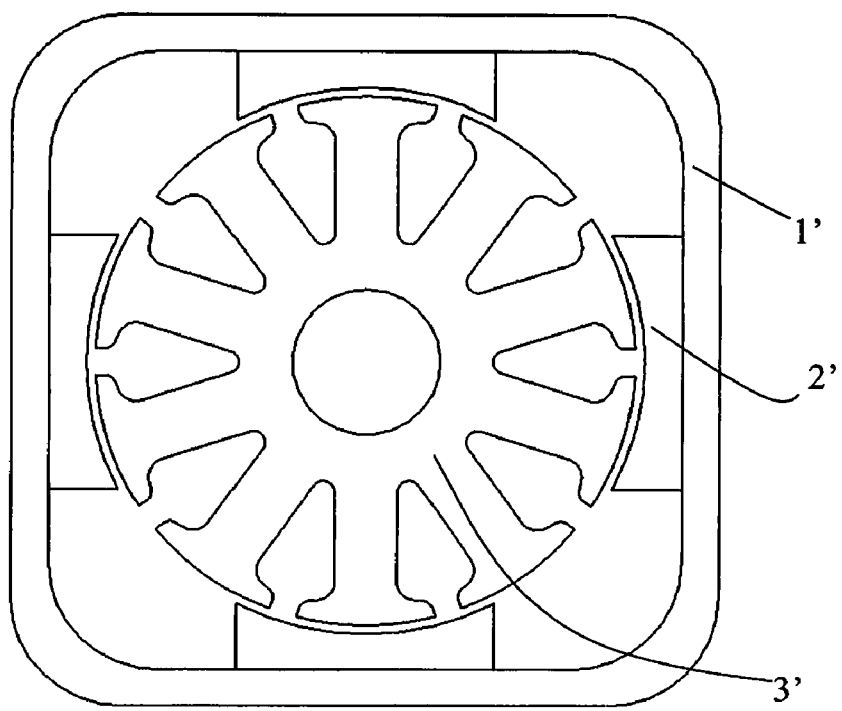
FIG. 8 is a cross sectional view of another prior art motor.

FIG. 6 shows a motor according to the sixth embodiment of the present invention. The rotor comprises two magnets 12, which are attached to the inner surface of respective arcuate connection portions 10b defined in a diagonal of the shell. The two magnets are both polarized along the radial direction of rotor. Each magnet 12 has the same polarization direction. In this embodiment, the north pole of each magnet is outward. The magnetic lines issued by the north pole of each magnet extend through the shell and return to the south pole of the magnet via the rotor. The magnetic lines enter the rotor by crossing the air gap between the shell and the rotor. The shell at the arcuate connection portions of the other diagonal has a profile to form a narrow air ap with the rotor, thus forming a phantom pole. Thus each magnet forms two magnetic circuits. The two magnets commonly form a stator with four magnetic poles.

To sum up, the permanent magnets of motor in the present invention are located in the corners or inner angle of the polygon shell. Thus the diameter of the rotor can be the greatest, and the power density of the motor can be increased without increasing the size of the motor. It is to be understood that the shell of the motor is not limited to a square motor. For example, the number of side walls of the motor shell may be six, eight, etc. The stator of the present invention can comprise 2n magnets which commonly form 2m magnetic poles, where m, n are positive integers, and m is not equal to n. It is most desirable that m is equal to half or twice n. It will be understood that the magnetic lines are representative of the magnetic flux paths through the motor.

Although the invention is described with reference to several preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising: a stator; and a rotor received in the stator; the stator comprising a shell, the cross section of the shell perpendicular to the rotor axis being polygon, wherein the shell comprises a plurality of side walls and arcuate connection portions connecting neighboring side walls, the stator comprises 2n magnets located in the arcuate connection portions, the magnets forming 2m magnetic poles which cooperatively form 2m magnetic circuits passing through the rotor and the shell, with m, n being positive integers, and m is not equal to n.

2. The motor of claim 1, wherein m is equal to half n or twice n.

3. The motor of claim 1, wherein two ends of each magnet are attached to adjacent side walls of the inner surface of the shell, and the middle part of the outer surface of each magnet is spaced from an inner surface of the shell such that a gap is formed between each magnet and the corresponding arcuate connection portion, adhesive for securing the magnets to the shell is placed in the gap.

4. The motor of claim 1, wherein the shell has a uniform thickness, and a slab of magnetically conductive material is disposed between the magnets and the corresponding arcuate connection portions.

5. The motor of claim 1, wherein the thickness of the arcuate connection portions is greater than the thickness of the side walls.

6. The motor of claim 1, wherein the magnets are attached to the inner surface of corresponding arcuate connection portions or embedded in the corresponding arcuate connection portions.

7. The motor of claim 1, wherein some of the magnets are attached to the inner surface of corresponding arcuate connection portions, and the remaining magnets are embedded in the corresponding arcuate connection portions, the surface-mounted magnets and embedded magnets being alternately circumferentially spaced about the shell.

8. The motor of claims 1, wherein the shell is square and there are four magnets which are respectively attached to the inner surface of four arcuate connection portions or are embedded in the four arcuate connection portions of the shell, the magnets commonly forming a stator with two magnetic poles.

9. The motor of claim 1, wherein the shell is square and there are four magnets, wherein two magnets are respectively attached to the inner surface of arcuate connection portions in a diagonal of the shell, and the other two magnets are respectively embedded in the arcuate connection portions in another diagonal of the shell.

10. The motor of claims 1, wherein there are four magnets which are respectively attached to the inner surface of four arcuate connection portions and commonly forming a stator with eight magnetic poles.

11. The motor of claims 1, wherein the shell is square, there are two magnets which are respectively attached to the inner surface of arcuate connection portions in one diagonal of the shell, the magnets commonly forming a stator with four magnetic poles.

\* \* \* \* \*